(12) United States Patent
van der Lugt et al.

(10) Patent No.: US 10,678,588 B2
(45) Date of Patent: Jun. 9, 2020

(54) REDUCING SYNCHRONIZATION OF TASKS IN LATENCY-TOLERANT TASK-PARALLEL SYSTEMS

(71) Applicant: Oracle International Corporation, Redwood Shores, CA (US)

(72) Inventors: Jan van der Lugt, San Francisco, CA (US); Timothy L. Harris, Cambridge (GB); Sungpack Hong, Palo Alto, CA (US); Hassan Chafi, San Mateo, CA (US)

(73) Assignee: Oracle International Corporation, Redwood City, CA (US)

( * ) Notice: Subject to any disclaimer, the term of this patent is extended or adjusted under 35 U.S.C. 154(b) by 30 days.

(21) Appl. No.: 15/597,460

(22) Filed: May 17, 2017

(65) Prior Publication Data

US 2017/0249187 A1 Aug. 31, 2017

Related U.S. Application Data

(63) Continuation of application No. 14/139,077, filed on Dec. 23, 2013, now abandoned.

(51) Int. Cl.
*G06F 9/48* (2006.01)
(52) U.S. Cl.
CPC ................... *G06F 9/4881* (2013.01)
(58) Field of Classification Search
CPC ...................................................... G06F 9/4881
See application file for complete search history.

(56) References Cited

U.S. PATENT DOCUMENTS

| 7,069,306 B1 * | 6/2006 | Lenoski ............. G06F 12/0817 709/213 |
| 7,415,559 B1 | 8/2008 | Butterworth |
| 2001/0011323 A1 | 8/2001 | Ohta |
| 2005/0097556 A1 | 5/2005 | Code |
| 2006/0168432 A1 | 7/2006 | Caprioli |
| 2007/0124736 A1 | 5/2007 | Gabor |
| 2009/0172212 A1 * | 7/2009 | Stanton ................. G06F 13/122 710/18 |

(Continued)

OTHER PUBLICATIONS

U.S. Appl. No. 14/139,077, filed Dec. 23, 2013, Office Action, dated Sep. 29, 2015.

(Continued)

*Primary Examiner* — Charlie Sun
(74) *Attorney, Agent, or Firm* — Hickman Palermo Becker Bingham LLP; Daniel D. Ledesma

(57) ABSTRACT

Techniques are provided for reducing synchronization of tasks in a task scheduling system. A task queue includes multiple tasks, some of which require an I/O operation while other tasks require data stored locally in memory. A single thread is assigned to process tasks in the task queue. The thread determines if a task at the head of the task queue requires an I/O operation. If so, then the thread generates an I/O request, submits the I/O request, and may place the task at (or toward) the end of the task queue. When the task reaches the head of the task queue again, the thread determines if data requested by the I/O request is available yet. If so, then the thread processes the request. Otherwise, the thread may place the task at (or toward) the end of the task queue again.

20 Claims, 4 Drawing Sheets

(56) References Cited

U.S. PATENT DOCUMENTS

| | | | |
|---|---|---|---|
| 2014/0245295 A1 | 8/2014 | Tsirkin | |
| 2015/0026442 A1* | 1/2015 | Giroux | G06F 9/3836 712/233 |
| 2015/0095551 A1* | 4/2015 | Confalonieri | G11C 16/06 711/103 |

OTHER PUBLICATIONS

U.S. Appl. No. 14/139,077, filed Dec. 23, 2013, Office Action, dated Aug. 11, 2016.
U.S. Appl. No. 14/139,077, filed Dec. 23, 2013, Final Office Action, dated Nov. 17, 2016.
U.S. Appl. No. 14/139,077, filed Dec. 23, 2013, Final Office Action, dated Feb. 4, 2016.
Wikipedia, the free encyclopedia, "Little's Law", last accessed on Nov. 6, 2014, 6 pages.
Poehlman, Digital Systems and Systems Programming, dated 2008, McMaster University.
GraphLab.org, "GraphLab Open Source", GraphLab Create Build an end-to-end recommender in Python, last viewed on Nov. 6, 2014, 2 pages.
Giraph, "Welcome to Apache Giraph!", http://giraph.apache.org/, last viewed on Nov. 6, 2014, 1 page.
Fouss, Francois, et al. "Random-walk computation of similarities between nodes of a graph with application to collaborative recommendation.", dated May 16, 2006, 31 pages.
Algorithms and Data Strucutures Fall 2007, Robert Sedgewick and Kevin Wayne, dated 2007.
Harris, Tim, et al. "AC: composable asynchronous IO for native languages." OOPSLA '2011, '11 Proceedings of the 2011 ACM international conference, 17 pages.

* cited by examiner

REDUCING SYNCHRONIZATION OF TASKS IN LATENCY-TOLERANT TASK-PARALLEL SYSTEMS

CROSS-REFERENCE TO RELATED APPLICATIONS; BENEFIT CLAIM

This application claims the benefit as a Continuation of application Ser. No. 14/139,077, filed Dec. 23, 2013 the entire contents of which is hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

FIELD OF THE DISCLOSURE

The present disclose generally relates to task scheduling and, more particularly, to reducing synchronization of tasks.

BACKGROUND

In computing, a task is a unit of work. A process or thread is said to "execute" a task if the process or thread performs the unit of work or causes the unit of work to be performed. Because a program may require millions of tasks to be executed, efficiently scheduling the tasks becomes extremely important. If tasks are not scheduled efficiently, then the program may take a significant time to execute.

One approach for implementing a task scheduling system is to provide calls to put a certain task to sleep and wake it up again. Tasks may be multiplexed over worker threads, with each worker thread executing tasks from a ready queue. If a task becomes blocked by, for example, issuing an I/O operation, then the task is "put to sleep" by placing the task in a wait queue, which may be one of many wait queues, each for a different type of I/O operation. Once the I/O operation completes, the task is woken up using the wake operation. "Waking" a task involves dequeuing the task from the wait queue and enqueuing the task in a ready queue so work for the task will be resumed once the task reaches the front of the ready queue.

Under this approach, the ready queue becomes a shared resource between the task executing thread and the thread handling callbacks generated upon completion of I/O operations. Because multiple threads access the ready queue and the wait queue, synchronization constructs are added to each queue operation, which results in adding overhead to task operations. Such overhead may not be significant if the overhead is small relative to latency of the I/O operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
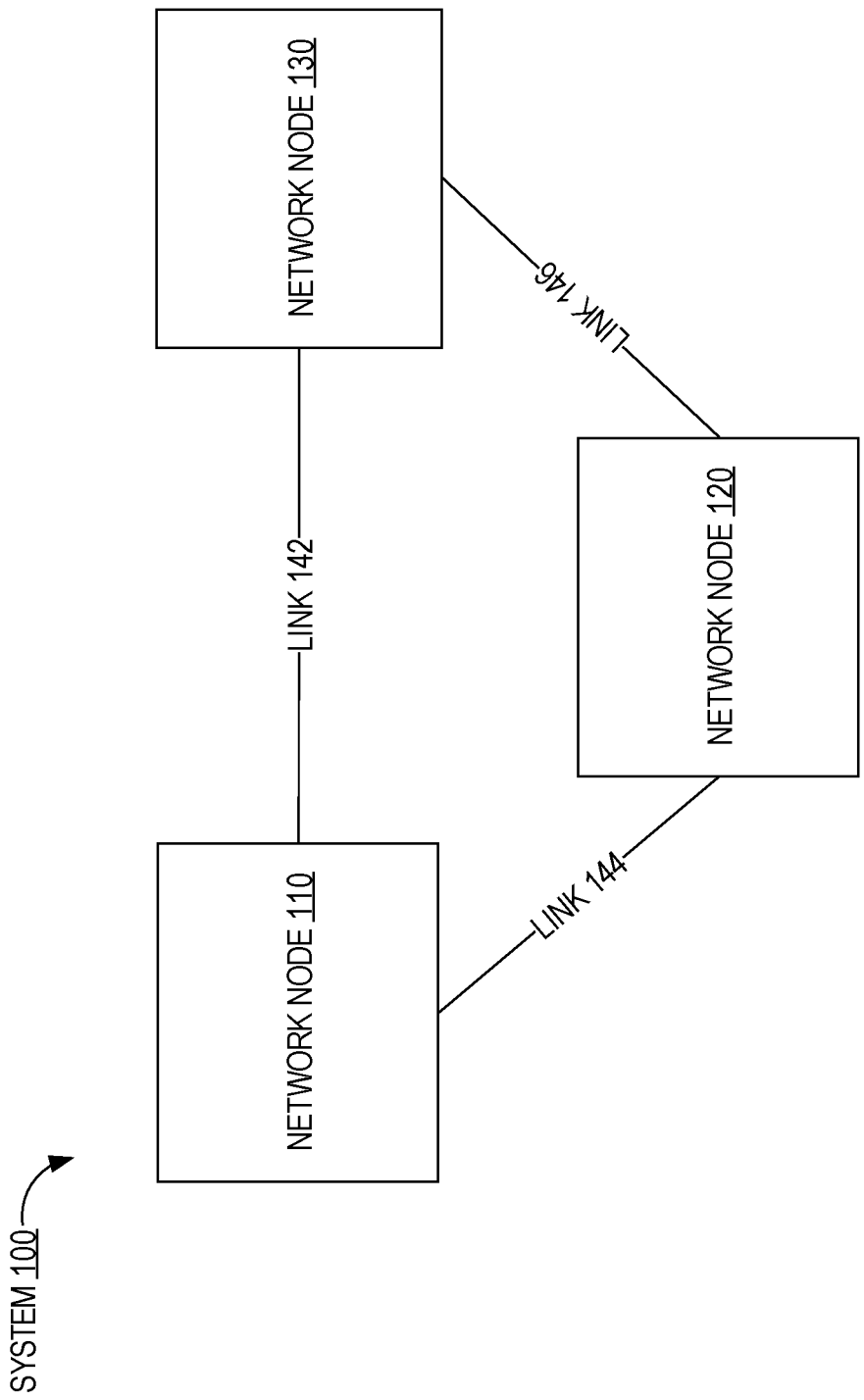
FIG. 1 is a block diagram that depicts an example system of network nodes, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

New kinds of applications require frequent communication among nodes in a network but a relatively low computation-to-I/O (communication) ratio. An example of such an application is distributed graph analysis. Such applications typically require many small computations where each single computation requires many remote data accesses. Fortunately, these applications also exhibit a great degree of parallelism. Therefore, long communication latency can be hidden through context-switching between large numbers of concurrent computations between which each computation does not depend on other computations.

However, in such cases, the aforementioned task queue overheads can be significant in performance. Due to a large number of concurrent computations and small computation-to-communication ratio, task switching (i.e., where a task moves from a ready queue to a wait queue and back to the ready queue) happens very frequently and, therefore, overheads in task switching accumulate rapidly and become significant.

According to techniques described herein, a task queue does not become a shared resource. Instead, a task executing thread maintains sole ownership of a task queue. Such an arrangement is advantageous because there is no need for synchronization between multiple threads. Removing this synchronization can lead to improved performance and scalability. Such an arrangement is beneficial in applications where the time taken for an individual I/O operation to complete is significantly less than the time taken for a thread to execute all of the other tasks that are in the task queue. By the time the thread has finished the other work available to the thread in the task queue, the I/O operation that the thread has issued is likely to have completed.

Once a task is inserted into a task queue, the task (even if it requires an I/O operation) is not reassigned to other queues. Instead, an I/O task is reinserted into the task queue while the I/O task "waits" for an I/O operation to complete. Avoiding the use of wait queues is advantageous because there is no need for synchronization between a thread making a task wait and a thread waking a task. Furthermore, avoiding the need to transfer a task from a wait queue to a task queue reduces the latency in waking a task In an embodiment, no more than a single working thread in a computing device is allowed to process tasks in a task queue. In a related embodiment, multiple threads can access tasks in a task queue. For example, initially, each of multiple threads is assigned its own task queue. Later, a first thread processes a task from a task queue assigned to a second thread if there are no more tasks in the task queue assigned to the first thread. Task queue sharing (by multiple threads) may be efficient if synchronization between threads running on the same processing core is efficient.

Although the following description includes examples related to graph analysis, embodiments are not limited to any particular type of data processing.

System Overview

FIG. 1 is a block diagram that depicts an example system 100, in an embodiment. System 100 includes three network nodes 110, 120, and 130. Although three network nodes are depicted, embodiments are not limited to a system of three network nodes. Instead, embodiments are applicable to systems with one, two, or more network nodes. For example, a task may wait on locks, barriers, or other synchronization operations with other threads in the same computing node or on I/O operations on a disk or other storage within the same computing node.

Each network node in system 100 includes one or more processors and memory for storing instructions that are executable by the one or more processors for performing techniques described herein. The memory of each network node stores results of operations and data that is retrieved from one or more other network nodes. Each network node may also include (or be connected to) non-volatile storage that stores data required by the network node.

Each network node in system 100 is communicatively coupled to each other network node by a link. For example, network node 110 is connected to network node 130 by link 142 and network node 110 is connected to network node 120 by link 144. Links 142-146 allow network nodes 110-130 to be directly connected to each or at least communicatively coupled to each other. For example, one or more of links 142-146 may be a network that is implemented by any medium or mechanism that provides for the exchange of data between respective network nodes. Examples of such a network include, without limitation, a cluster interconnect network, Local Area Network (LAN), Wide Area Network (WAN), Ethernet or the Internet, or one or more terrestrial, satellite or wireless links.

Each network node in system 100 is configured to send requests for data, over one of links 142-146, to one or more of the other network nodes. For example, the requests may be for graph data, a different portion of which is stored in different ones of network nodes 110-130. As a specific example, if network node 110 is determining whether there are any graph vertices in common between the neighbors of vertex A and the neighbors of vertex B and network node 110 does not have data that indicates the neighbors of vertex B, then network node 110 sends a request for the neighbors of vertex B to network node 120 and/or network node 130. If network node 110 does not know ahead of time which network node stores (or has access to) the neighbors of vertex B, then network node 110 may send a request for the data to both network node 120 and network node 130.

In an embodiment, each network node is configured to know to which other network node to send network I/O requests. For example, a graph may be divided among network nodes 110-130 and each network node stores mapping data that indicates which network node stores which neighbor data. For example, for a graph that includes vertices 1-3,000,000, mapping data indicates that network node 110 stores neighbor data that identifies neighbors for vertices 1-1,000,000, network node 120 stores neighbor data that identifies neighbors for vertices 1,000,000-2,000,000, and network node 130 stores neighbor data that identifies neighbors for vertices 2,000,000-3,000,000.

Computing Node

Figure 2:
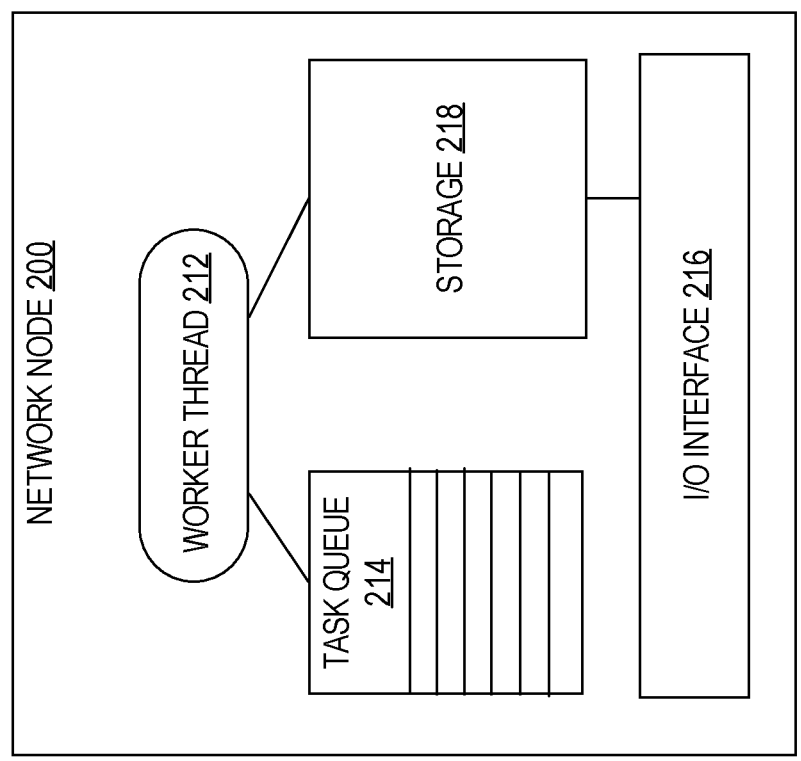
FIG. 2 is a block diagram that depicts a network node, in an embodiment.

FIG. 2 is a block diagram that depicts a computing node 200, in an embodiment. Computing node 200 may be any one of network nodes 110-130 in FIG. 1. Computing node 200 includes a worker thread 212, a task queue 214, an I/O interface 216, and storage 218.

While only one worker thread 212 is depicted in computing node 200, computing node 200 may include multiple worker threads, each of which is assigned to a different task queue of multiple task queues (not depicted). The number of (software) worker threads may be dependent on the number of hardware threads or cores in computing node 200. For example, if computing node 200 has a dual core processor that supports two hardware threads per core, then computing node 200 may have four worker threads. Thus, computing node 200 may have four task queues, one for each software thread. As another example, if computing node has eight quad-core processors with two hardware threads per core, then computing node may have 64 worker threads. Thus, the determination of the number of task queues to create and the number of worker threads to initiate may be based on determining a number of processors that a computing device (that will include the tasks queues and worker threads) includes.

Task queue 214 includes zero or more tasks. Task queue 214 has a "front" or "head" and an "end" or "tail." Tasks that are at the head of task queue 214 are processed before tasks that are at the tail of task queue 214. At any one time, task queue 214 may include thousands or millions of tasks. Each task corresponds to one or more operations. When a task is processed by worker thread 212, worker thread 212 causes an operation associated with the task to be performed. If a task is associated with only one operation, then, once worker thread 212 processes the task, the task is removed from task queue 214. If a task is associated with multiple operations, then worker thread 212 may cause all or some of the multiple operations to be performed. If not all operations are performed, then worker thread 212 places the task at the end of task queue 214 (or at another position in task queue 214).

In an embodiment, task queue 214 comprises a set of pointers to tasks. In this way, the task themselves (which may be simple data structures of one or more variables) do not need to be copied or moved around in memory in order to place the tasks in task queue 214. Instead, memory pointers, which may be much smaller in size than their corresponding tasks, are added to and removed from task queue 214. Thus, as described herein, "adding" a task to task queue 214 may involve storing the actual task at a certain location in (e.g., the end of) task queue 214 or adding a pointer (that points to or references the task) to task queue 214.

A task may be in one of multiple states. For example, the first time worker thread 212 processes a particular task, the particular task is initially in state A and advances to state B. The second and third times worker thread 212 processes the particular task, the particular task is in state B and remains in state B. The fourth time worker thread 212 processes the particular task, the particular task advances to state C.

Task queue 214 may be implemented in any number of ways, such as an array, a vector, or a linked list. While a linked list may be more flexible in allowing a task to be placed in any part of the queue, an array and a vector are more space efficient than a linked list and can facilitate faster operations on their head and tail.

Task queue 214 may be implemented as a FIFO queue. In that way, tasks are processed in the order in which the tasks are added to task queue 214.

Worker thread 212 "consumes" or processes tasks in task queue 214. Worker thread 212 is part of an application program that, when executed, causes the tasks to be generated. An example of such an application program is a graph analysis application program that determines common neighbors among nodes in a graph. In addition to consuming tasks in task queue 214, worker thread 212 may also be responsible for generating tasks that are placed in task queue 214.

Alternatively, in an embodiment, a separate thread (not depicted) is responsible for generating tasks and inserting them in task queue 214 while worker thread 212 consumes tasks from task queue 214. Each thread has access to data that indicates (a) a location of the head of task queue 214 (e.g., via an index value in an array) and/or (b) a location of the tail of task queue 214. In this way, generation and consumption of tasks may be performed concurrently. For example, a generating task maintains end location data that indicates a location in memory of the end of task queue 214 since only the generating task may need to know that location, while a consuming task maintains a start location data that indicates a location in memory of the start of the task queue 214 since only the consuming task may need to know that location.

Whether one thread or two threads may access task queue 214, the generation and consumption of tasks may occur in distinct phases that may or may not overlap. For example, in a first "generation" phase, one or more threads may be responsible for creating tasks and inserting the tasks into one or more task queues. Then, in a second "consumption" phase, a different thread is assigned to each task queue and processes the respective tasks. The generation phase may be required to complete before the consumption phase begins. Alternatively, the consumption phase may proceed as soon as a task is inserted into a task queue or after a certain number of tasks (e.g., 1,000) are inserted into the task queue.

Computing node 200 also includes an I/O interface 216. I/O interface 216 may be an interface for network I/O or disk I/O. For example, I/O interface 216 allows network data requests for data to be sent to (and responses to be received from) other network nodes that are communicatively coupled to computing node 200. The network data requests may originate from worker thread 212. As another example, I/O interface 216 allows storage I/O requests to be sent to (and responses to be received from) non-volatile storage (not depicted), which may be internal or external to computing node 200. Again, storage I/O requests may originate from worker thread 212.

In an embodiment, I/O interface 216 corresponds to multiple separate I/O devices. For example, different physical network devices may be combined into one logical I/O interface.

Computing node 200 also includes storage 218, which may be volatile or non-volatile storage. Storage 218 stores results of requests (whether network data requests or storage I/O requests). For example, results retrieved from another network node based on a particular network data request are stored in storage 218. The results may be stored in association with data that identifies the particular network data request. If worker thread 212 is currently processing a task that is "waiting" for results of an I/O request, then worker thread 212 checks storage 218 for those results.

In an embodiment, computing node 200 includes a receiver thread (not depicted) that is responsible for handling callbacks (such as I/O completion events), from hardware of computing node 200, by acknowledging the callbacks. Doing so ensures that a queue for storing the callbacks does not overrun.

In an embodiment, computing node 200 includes a communication thread (not depicted) that is responsible for receiving requests for data from other network nodes, reads or writes the requested data in the local storage, and response to the requests.

Example Process

Figure 3:
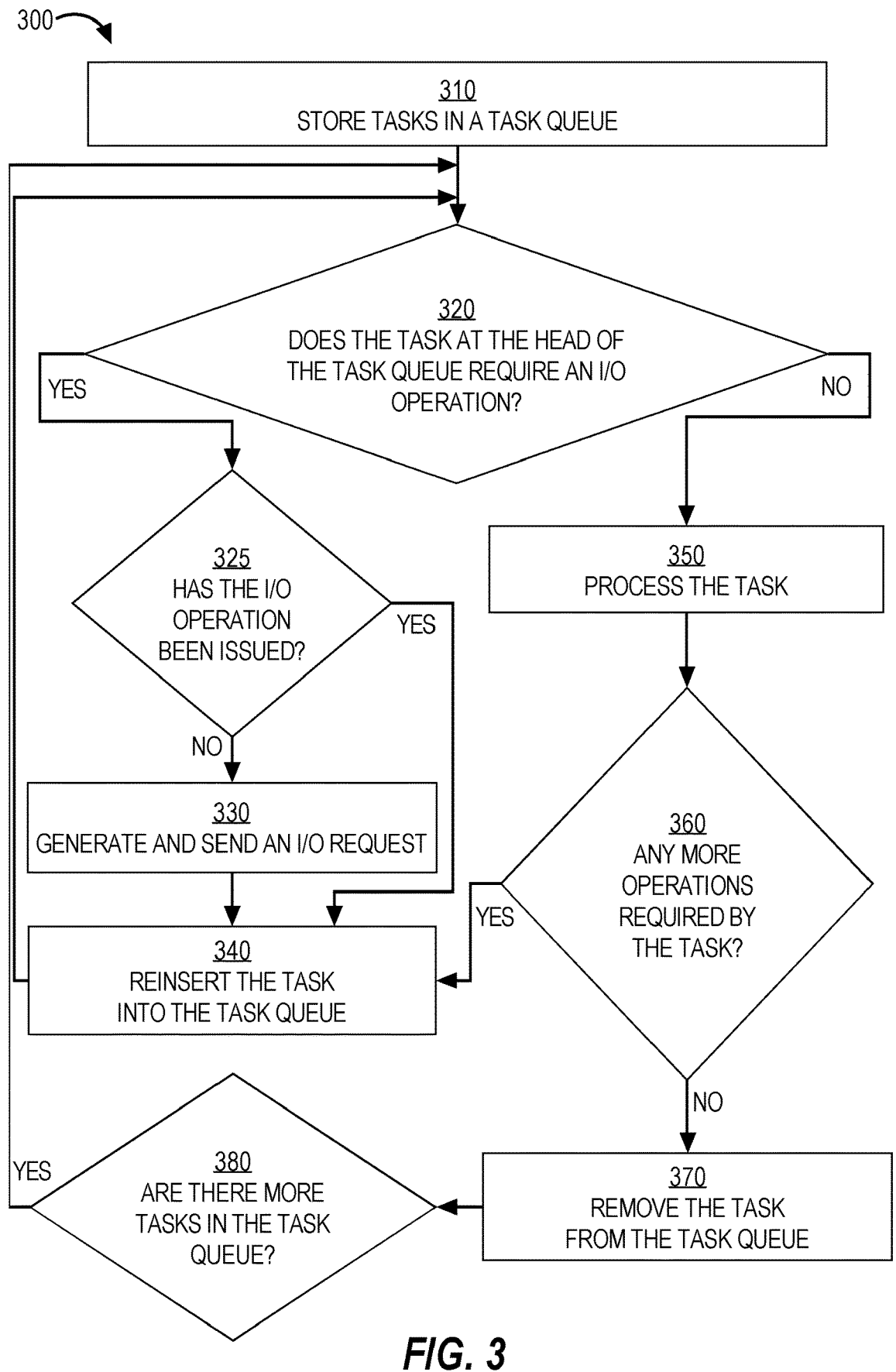
FIG. 3 is a flow diagram that depicts a process for processing tasks, in an embodiment.

FIG. 3 is a flow diagram that depicts a process 300 for reducing synchronization of processing tasks, in an embodiment.

At block 310, multiple tasks are stored in task queue 214 to which only worker thread 212 is assigned for processing.

At block 320, worker thread 212 determines whether the task at the head of task queue 214 indicates an I/O operation, such as a network I/O operation or a disk I/O operation. If so, process 300 advances to block 325. Else, process 300 advances to block 350. A task may indicate or require multiple I/O operations.

At block 325, it is determined whether the I/O operation has been issued. If not, then process advances to block 330. Else, process 300 advances to block 340.

At block 330, worker thread 212 generates an I/O request and causes the I/O request to be sent through I/O interface 216.

At block 340, worker thread 212 places the task at another position in task queue 214, such as the end of task queue 214, without placing the task in any other queue. Block 340 may involve modifying one or more variables of the task to indicate that the task is "waiting" for an I/O response. If the task is not waiting for an I/O response and block 340 is entered from block 360 (described below), then the task is modified to indicate what operation(s) of the task are left to perform and/or what operation(s) of the task have been performed. Whatever type of operation is performed for the task, a modification of the task may involve updating state information that indicates which state (of multiple states of a state machine) the task is in.

Because I/O tasks are not inserted into another "waiting" queue that is managed by another thread, synchronization of such tasks is eliminated entirely.

At block 350, worker thread 212 processes the task, which does not involve an IO operation. Instead, the task may require data that is stored in local (i.e., relative to network node) memory. Thus, worker thread 212 may access the memory and perform one or more operations indicated by the task.

At block 360, worker thread 212 determines whether any more operations need to be performed for the task. If so, then process 300 proceeds to block 340. Else, process 300 proceeds to block 370, where the task is removed from task queue 214.

At block 380, worker thread 212 determines whether any more tasks remain in task queue 214. This determination may be performed by comparing a head position value (that indicates a position of the most recently-processed task in task queue 214) with a tail position value (that indicates a position of the last task in task queue 214). If, for example, the head position value is not the same as the tail position value, then tasks remain in task queue 214. If the determination of block 380 is true, then process 300 proceeds to block 320 where the next task in task queue 214 is analyzed.

Following process 300, the need for synchronization among multiple threads is removed for both blocking (when a task is moved from a ready queue to a wait queue) and wake-up (when the task is moved from the wait queue to the ready queue). This allows task scheduling software to use simpler and more efficient data structures. In addition, process 300 removes the need for software to run upon 110 completions because there is no need to perform a wake-up operation.

Intelligent Task Placement

As described previously, a task is reinserted into task queue 214 after determining that the task is "waiting" for data from an I/O request. Instead of inserting the task at the end of task queue 214 (i.e., after the last task currently in task queue 214), the task may be inserted into a "non-tail" position in task queue 214. For example, the task may be inserted at a mid-point in task queue 214.

One or more factors may be taken into account to determine where to reinsert a task. Such factors may include I/O latency and task latency. I/O latency refers to an expected wait time before a response to an I/O request is available for an I/O task. I/O latency may change from time to time based on current and/or previous statistics regarding actual I/O latency. For example, initially, I/O latency may be 20 microseconds. Over time, however, I/O latency may increase to 95 microseconds.

Task latency refers to an expected time required to process each task once it reaches the head of task queue 214. Task latency may also change from time to time based on current task processing statistics.

For example, if there are 1,000 tasks in task queue 214, I/O latency is 20 microseconds, and task latency is 90 nanoseconds, then it is estimated that 223 tasks in task queue 214 will be processed before the data from an I/O request will be available for an I/O task that is at the head of task queue 214. Therefore, the I/O task may be inserted immediately after the $222^{nd}$ task in task queue 214. To account for unexpected delays or slowdowns in I/O traffic and/or for some tasks requiring more complex operations than others, the I/O task may be inserted at a later position in task queue 214, such as 1.5× or 2× the calculated position.

In an embodiment, the factor (e.g., whether 1.5× or 2×) is adapted in response to "early" or "late" execution of tasks. For example, worker thread 212 maintains a position estimate of 1.25× and increases the position estimate if worker thread 212 determines that "waiting" I/O tasks are repositioned in task queue 214. In other words, after being repositioned in task queue 214, I/O tasks are arriving at the head of task queue 214 without their corresponding I/O operations being completed yet. Alternatively, worker thread 212 decreases the position estimate if worker thread 212 determines that "waiting" I/O tasks have corresponding I/O operations that are always (or almost always, such as +90%) complete.

In order to allow insertion of a task at any arbitrary position, task queue 214 may be implemented as a linked list. However, the scattered memory consumption and traversal of linked lists may not be optimal.

If task queue 214 is implemented as an array (or vector), then, in order to insert a task between two tasks, a set of tasks that will be after the reinserted task are copied from task queue 214 and reinserted (for example, one position later) into task queue 214. Given the previous example of 1,000 tasks, tasks at positions 223-1000 are copied and moved to positions 224-1001, respectively. The to-be-reinserted task is then inserted into the vacated position (i.e., 223 in this example).

Alternatively, instead of moving (potentially) many tasks for each reinsertion, task queue 214 may be formed by leaving a certain number of slots in task queue 214 available for reinsertions. For example, as tasks are added to task queue 214, every tenth slot is left empty to allow a future I/O task to be inserted into one of the available slots. An available slot may be identified by first calculating a position based on I/O latency and task latency and then iteratively searching for an available slot that is after the calculated position. Alternatively, data that identifies available slots is maintained so that worker thread 212 may quickly identify an available slot after calculating a position based on I/O latency and task latency. Alternatively, the task queue may be represented by a linked list of array chunks, allowing tasks to be inserted between chunks in this list.

Regardless of how task queue 214 is implemented, the further a task is placed from the front of task queue 214, the higher the time the task can be waiting in task queue 214 since the task's associated I/O operation has completed, but the lower the chance that worker thread 212 will check for I/O results that are not yet available.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
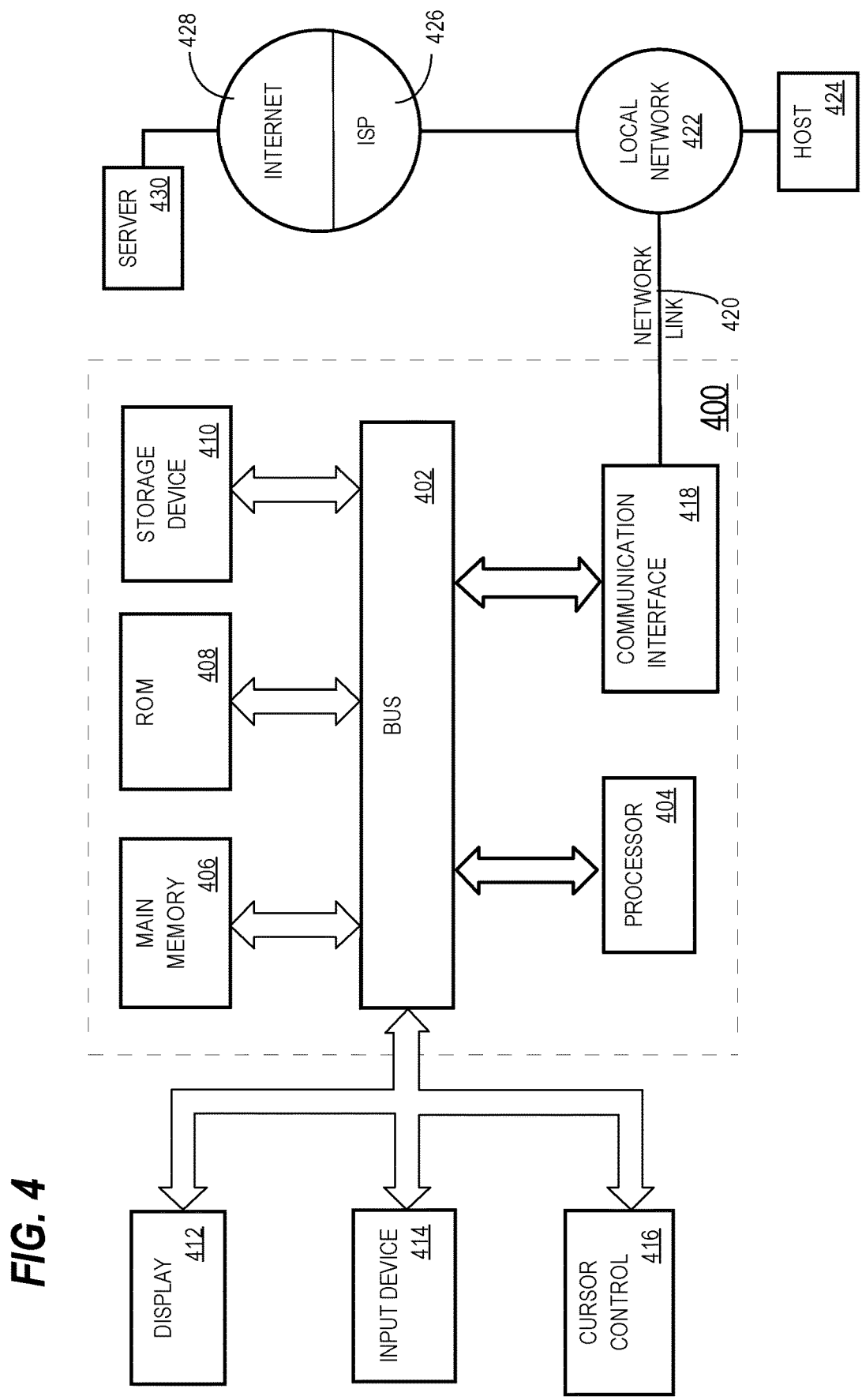
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in a first network node, a plurality of tasks in a queue of tasks;
   for each task of the plurality of tasks;
      determining, by a single thread, whether said each task requires a network I/O operation that involves retrieving data from another network node of a plurality of network nodes that includes the first network node, wherein each network node in the plurality of network nodes comprises one or more processors and one or more non-volatile storage media;
      in response to determining that said each task requires a network I/O operation:
         generating a network I/O request;
         sending the network I/O request to a network node that is different than the first network node;
         without placing said each task in another queue, retaining said each task in the queue;
         selecting, by the single thread, a subsequent task in the queue to process;

wherein each network node of the plurality of network nodes is assigned and stores a different portion of a graph of a plurality of vertices;

wherein the first network node stores (1) a first portion of the graph and (2) first mapping data that indicates a second network node, of the plurality of network nodes, stores a second portion of the graph that is different than the first portion;

wherein the second network node in the plurality of network nodes stores (3) the second portion of the graph and (4) second mapping data that indicates that the first network node stores the first portion of the graph;

wherein the method is performed by one or more computing devices.

2. The method of claim 1, further comprising:
after retaining a particular task in the queue, processing, by the single thread, other tasks of the plurality of tasks without processing the particular task;
wherein after processing the other tasks, the particular task is at the head of the queue;
determining, by the single thread, whether data associated with a particular network I/O request that was generated for the particular task is available.

3. The method of claim 2, further comprising:
in response to determining that data associated with the network I/O request is not available and without placing the particular task in another queue:
 retaining the particular task in the queue;
 selecting, by the single thread, a task that is subsequent to the particular task in the queue to process.

4. The method of claim 2, further comprising:
in response to determining that data associated with the network I/O request is available, processing, by the single thread, the particular task based on the data associated with the network I/O request.

5. A method comprising:
storing a plurality of tasks in a queue of tasks;
for each task of the plurality of tasks;
 determining, by the single thread, whether said each task requires an I/O operation;
 in response to determining that said each task requires an I/O operation:
  generating and sending an I/O request;
  without placing said each task in another queue, retaining said each task in the queue;
  selecting, by the single thread, a subsequent task in the queue to process;
after retaining a particular task in the queue, processing, by the single thread, other tasks of the plurality of tasks without processing the particular task;
wherein after processing the other tasks, the particular task is at the head of the queue;
determining, by the single thread, whether data associated with a particular I/O request that was generated for the particular task is available;
in response to determining that data associated with the particular I/O request is available, processing, by the single thread, the particular task based on the data associated with the particular I/O request;
after processing the particular task based on the data associated with the particular I/O request, determining, by the single thread, whether the particular task requires one or more other operations.

6. The method of claim 5, further comprising:
if it is determined that the particular task does not require one or more other operations, then removing, by the single thread, the particular task from the queue of tasks;
if it is determined that the particular task requires one or more other operations, then causing the one or more other operations to be performed.

7. The method of claim 1, wherein the plurality of tasks includes a particular task and the plurality of network nodes includes a third network node, the method further comprising:
in response to determining that the particular task requires a network I/O operation:
 generating a first network I/O request and a second network I/O request;
 sending the first network I/O request to the second network node that is different than the first network node;
 sending the second network I/O request to the third network node that is different than the first network node;
 without placing the particular task in another queue, retaining the particular task in the queue;
 selecting, by the single thread, a task, that is subsequent to the particular task in the queue, to process.

8. The method of claim 1, wherein the plurality of tasks includes a particular task, the method further comprising:
in response to determining that the particular task requires a particular network I/O operation:
 determining, from among the plurality of network nodes, that the second network node stores data required by the particular network I/O operation;
 generating a first network I/O request;
 sending the first network I/O request to the second network node that is different than the first network node;
 without placing the particular task in another queue, retaining the particular task in the queue;
 selecting, by the single thread, a task, that is subsequent to the particular task in the queue, to process.

9. The method of claim 8,
wherein determining that the second network node stores the data required by the particular network I/O operation is based on analyzing the first mapping data.

10. The method of claim 1, further comprising:
in response to determining that said each task requires a network I/O operation, updating state information associated with said each task to indicate that said each task is awaiting a response from the network I/O request.

11. One or more non-transitory computer-readable media carrying instructions which, when executed by one or more processors, cause:
storing a plurality of tasks in a queue of tasks;
identifying, by a single thread, a particular task that is at the head of the queue, wherein the particular task is one of the plurality of tasks;
determining, by the single thread, whether the particular task requires an I/O operation;
in response to determining that the particular task requires an I/O operation:
 generating and sending an I/O request;
 updating state information associated with the particular task to indicate that a response to the I/O request is pending;
 without placing the particular task in another queue, retaining the particular task in the queue;

selecting a subsequent task in the queue of tasks to process;
wherein the plurality of tasks includes a second task and a plurality of network nodes includes a first network node and a second network node that is different than the first network node;
in response to determining that the second task requires a network I/O operation:
generating a first network I/O request and a second network I/O request;
sending the first network I/O request to the first network node;
sending the second network I/O request to the second network node;
without placing the second task in another queue, retaining the second task in the queue;
selecting, by the single thread, a task, that is subsequent to the second task in the queue, to process.

12. The one or more non-transitory computer-readable media of claim 11, wherein the I/O request is a storage I/O request to retrieve data from non-volatile storage.

13. The one or more non-transitory computer-readable media of claim 11, wherein the instructions, when executed by the one or more processors, further cause:
after retaining the particular task in the queue, processing, by the single thread, other tasks of the plurality of tasks without processing the particular task;
wherein after processing the other tasks, the particular task is at the head of the queue;
determining, by the single thread, whether data associated with the I/O request is available.

14. The one or more non-transitory computer-readable media of claim 13, wherein the instructions, when executed by the one or more processors, further cause:
in response to determining that data associated with the I/O request is not available, retaining, by the single thread, the particular task in the queue.

15. The one or more non-transitory computer-readable media of claim 13, wherein the instructions, when executed by the one or more processors, further cause:
in response to determining that data associated with the I/O request is available, processing, by the single thread, the particular task based on the data associated with the I/O request.

16. The one or more non-transitory computer-readable media of claim 15, wherein the instructions, when executed by the one or more processors, further cause updating the state information to indicate that the I/O request has completed.

17. The one or more non-transitory computer-readable media of claim 15, wherein the instructions, when executed by the one or more processors, further cause:
after processing the particular task based on the data associated with the I/O request, determining, by the single thread, whether the particular task requires one or more other operations.

18. The one or more non-transitory computer-readable media of claim 17, wherein the instructions, when executed by the one or more processors, further cause:
if it is determined that the particular task does not require one or more other operations, then removing, by the single thread, the particular task from the queue of tasks;
if it is determined that the particular task requires one or more other operations, then causing the one or more other operations to be performed.

19. A first computer system comprising:
one or more processors;
one or more computer-readable media storing instructions which, when executed by the one or more processors, cause:
storing a plurality of tasks in a queue of tasks;
identifying, by a single thread, a particular task that is at the head of the queue, wherein the particular task is one of the plurality of tasks;
determining, by the single thread, whether the particular task requires a network I/O operation that involves retrieving data from another computer system of a plurality of computer systems, wherein each computer system in the plurality of computer systems comprises one or more processors and one or more non-volatile storage media storing instructions that are executed by the one or more processors;
in response to determining that the particular task requires a network I/O operation:
generating an I/O request;
sending the I/O request to a second computer system that is communicatively coupled to the first computer system;
without placing the particular task in another queue, retaining the particular task in the queue;
selecting, by the single thread, a subsequent task in the queue to process'
wherein the plurality of tasks includes a second task and the plurality of computer systems includes a third computer system;
in response to determining that the second task requires a particular network I/O operation:
determining, from among the plurality of computer systems, that the third computer system stores data required by the particular network I/O operation;
generating a first network I/O request;
sending the first network I/O request to the third computer system that is different than the first computer system;
without placing the second task in another queue, retaining the second task in the queue;
selecting, by the single thread, a task, that is subsequent to the second task in the queue, to process.

20. The one or more non-transitory computer readable media of claim 11, wherein:
each network node of the plurality of network nodes is assigned and stores a different portion of a graph of a plurality of vertices;
the first network node stores (1) a first portion of the graph and (2) first mapping data that indicates the second network node, of the plurality of network nodes, stores a second portion of the graph that is different than the first portion;
the second network node in the plurality of network nodes stores (3) the second portion of the graph and (4) second mapping data that indicates that the first network node stores the first portion of the graph.

* * * * *